Jan. 22, 1957
C. L. SAULT
2,778,218
METER AND TANK CALIBRATING EQUIPMENT
Filed Sept. 28, 1953
2 Sheets-Sheet 1
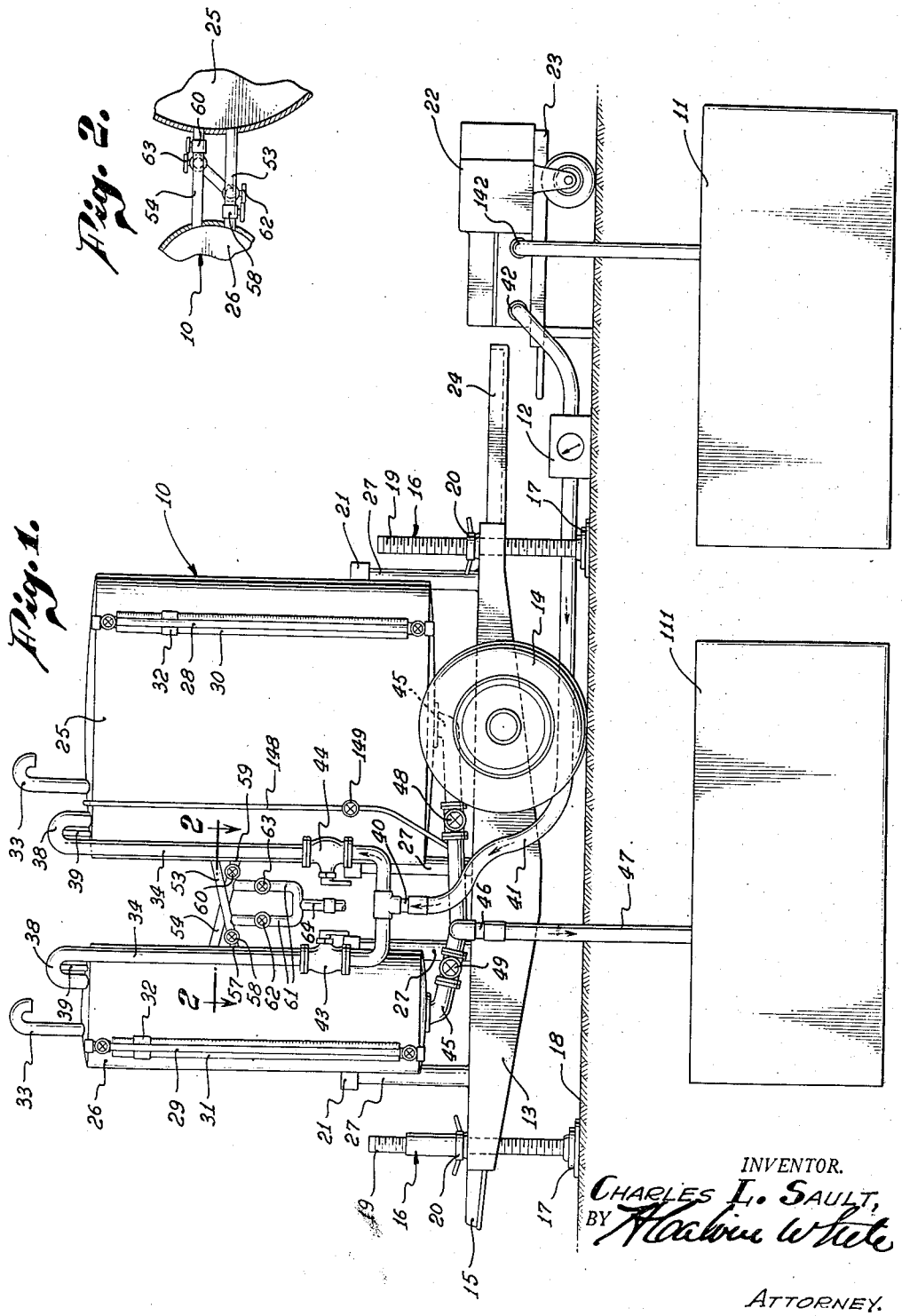
INVENTOR.
CHARLES L. SAULT,
BY
ATTORNEY.

Jan. 22, 1957
C. L. SAULT
2,778,218
METER AND TANK CALIBRATING EQUIPMENT
Filed Sept. 28, 1953
2 Sheets-Sheet 2
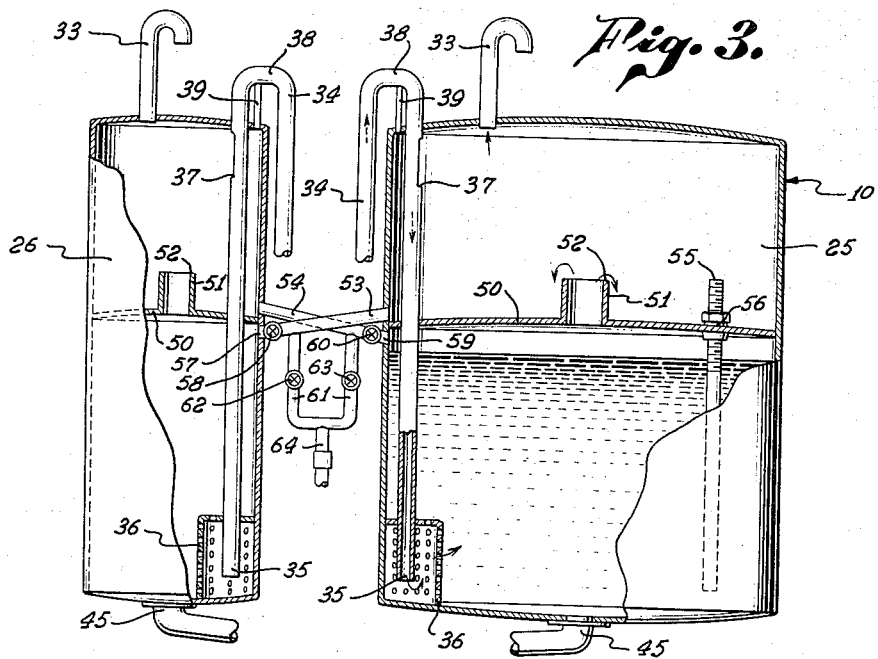
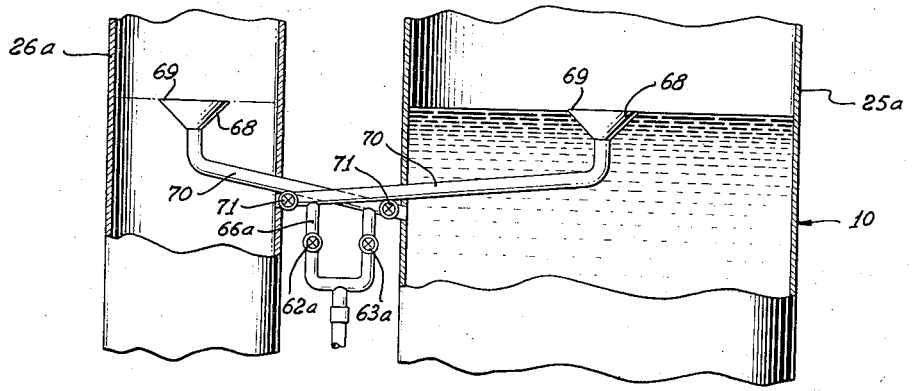
INVENTOR.
CHARLES L. SAULT,
BY
ATTORNEY.

United States Patent Office 2,778,218
Patented Jan. 22, 1957

2,778,218

METER AND TANK CALIBRATING EQUIPMENT

Charles L. Sault, Long Beach, Calif.

Application September 28, 1953, Serial No. 382,659

12 Claims. (Cl. 73—3)

This invention relates to improved apparatus for accurately calibrating meters or tanks, by transferring liquid between the meter or tank and a calibrating system of precisely known capacity, and then checking the reading of the calibrating system with the indications of the meter or tank being calibrated.

A common type of conventional calibrating unit includes an upstanding measuring tank into which liquid may be filled from a meter or tank being calibrated, the measuring tank being provided with an upper portion of reduced horizontal dimension into which the liquid rises after the main portion of the tank has been filled. The filling process is halted after the liquid rises into that upper portion of the tank, and a reading is then taken of the liquid level to indicate the total volume of transferred liquid. A major disadvantage of this arrangement resides in the necessarily very limited capacity of the upper reduced portion of such a tank, due to the practical height limit of a tank for this purpose, which limited capacity has required a slowing of the filling process to avoid overfilling long before the liquid level reaches the upper portion of the tank. This of course causes considerable loss in time during the calibrating process. Further, the overall height of a tank having such an upper reduced extension is greater than is desirable in the type of portable equipment preferably employed for tank and meter calibration.

An important object of the invention is to provide a calibrating tank system in which the filling process during a calibration operation may be continued at the maximum filling rate until the operation is completed, without the slowing heretofore required during the final stages of filling. Further contemplated is an arrangement in which the overall height of the apparatus is minimized. At the same time, it is desirable to so construct the apparatus as to be capable of use in a number of different ways, to satisfy the requirements of virtually any metering or calibrating operation.

Structurally, a unit embodying the invention includes two tanks one of which has a substantially larger horizontal area than the other. In the usual calibrating operation, liquid is first filled into the larger tank and then into the smaller one. Within the larger tank, I provide means acting to overflow to the small tank any liquid filled into the large tank above a predetermined level. At that predetermined overflow level, the quantity of liquid in the large tank is precisely known. The liquid overflowing into the small tank is then measured in any suitable manner, as by observation of a meter board placed behind a sight glass at the side of the tank, and is added to the known capacity of the large tank to arrive at the total amount of liquid transferred. The filling process may be stopped at a point such that the liquid will only partially fill the smaller tank, this typically being accomplished by commencing to turn off the filling pump or valve when the gauge glass of the large tank indicates that that tank is full.

In order to increase the versatility of the apparatus, I find it desirable to provide a reverse overflow, for overflowing liquid filled into the smaller tank to the large tank or to a discharge location. In this manner, I permit filling of the smaller tank to a precisely known volume, for use where it is desired to first fill that tank and then allow the known quantity of liquid to flow therefrom and into a tank being calibrated. The overflow from the larger tank may also be connectable to a discharge line, to permit its use in the above manner.

Preferably, the calibrating tanks are mounted to a trailer or other vehicle, to thus be easily movable to different locations for calibrating permanently located tanks or meters. In such a portable arrangement, I find it desirable to provide a jack or jacks for accurately leveling the vehicle at a particular test location. The vehicle may also carry spirit levels for indicating when the jacks are properly set.

The above and other features and objects of the present invention will be better understood from the following detailed description of the typical embodiments illustrated in the accompanying drawings, in which:

Fig. 1 is a side view of a first form of meter and tank calibrating unit embodying the invention;

Fig. 2 is a fragmentary horizontal section taken on line 2—2 of Fig. 1;

Fig. 3 is a fragmentary vertical section taken through the centers of the two metering tanks, and showing the interiors of the tanks; and Fig. 4 is a fragmentary sectional view corresponding to Fig. 3, but showing a variational form of overflow apparatus.

Referring first to Figs. 1 to 3, I have shown at 10 a portable unit for calibrating one or both of a pair of underground tanks 11 and 111, or a meter 12. Unit 10 is mounted to a trailer 13, having a pair of wheels 14, and having a conventional trailer hitch 15 at its forward end adapted for attachment to an automobile or other pulling vehicle. To the body of trailer 13 are mounted a plurality of jack units 16, whose bases 17 are engageable with a rod or ground surface 18 on which the trailer is supported. Jack units 16 are individually adjustable to accurately move the trailer body to a horizontal condition, to assure accuracy of the subsequently described metering equipment. There may typically be provided three such jack units, one being located at the forward end of the trailer near hitch 15, and the other two being located near the rear of the trailer and at its opposite sides. Each of the jack units may include a vertically extending screw element 19 attached to base 17, and engageable with a manually rotated nut 20 which is rotatably attached to the trailer body. In order to indicate exactly when the jack units have leveled the trailer body, I may provide on the trailer body several, typically three, conventional spirit levels 21, of the usual type having air bubbles within liquid filled horizontal tubes acting to move to a predetermined position when the tube is horizontal.

For transferring liquid during a calibrating operation, unit 10 may include a motor driven pump 22, which is typically mounted on a wheeled carriage 23. The pump and its carriage are received on a rear platform 24 of the trailer body during transportation of the unit, but may be moved to the ground surface 18 when the unit is in use.

The actual measuring or calibrating of liquid is effected by means of a pair of accurately calibrated metering tanks 25 and 26 mounted by stanchions 27 to the upper side of trailer 13. Of these two tanks 25 and 26, the former has a greater capacity and a greater horizontal cross sectional area. Preferably, both tanks have cylindrical side walls, and slightly convex top and bottom walls as shown. Also, the two tanks are desirably mounted in side by side relation, with their upper walls at a common height, and their lower walls at a second common height. In a typical arrangement which has actually been constructed and is now in use, the overall volume of tank 25 is about 690 gallons, while the overall volume of tank 26 is about 120 gallons. The horizontal cross sectional area of tank 25 may be between about 6 and 20 times as great as the horizontal cross sectional area of tank 26. In the arrangement which is now in use, the horizontal diameter of tank 25 is about 5 feet, and the horizontal diameter of smaller tank 26 is about 20 inches. At their upper ends, tanks 25 and 26 may have a pair of vents 33, for placing the upper interiors of the tanks in communication with the atmosphere.

The liquid levels within tanks 25 and 26 are indicated by a pair of sight glasses 28 and 29, behind which are mounted a pair of accurately calibrated gauge boards 30 and 31. Board 30 may typically be graduated at one gallon intervals whereas member 31 of tank 26 may be graduated at ¼ gallon intervals. Each of the gauge boards preferably carries a vertically slidable vernier scale 32, acting to increase the preciseness with which a reading may be taken.

A liquid being metered may be filled into either or both of the two tanks 25 and 26 through fill lines 34, which extend upwardly alongside the tanks and are then doubled back to extend downwardly within the tanks and discharge into the tanks near their lower ends at 35. About the lower discharge ends 35 of inlet lines 34, each of the tanks may contain a perforated baffle 36, acting to prevent excessive turbulence as the liquid is discharged into the tanks. Near the upper walls of the two tanks, fill lines 34 may contain wall apertures 37 placing the lines in communication with the upper interiors of the tanks. Also, I find it desirable to provide communication between the upper interior of the tanks and the uppermost curved portions 38 of lines 34, typically by means of a pair of small interconnecting conduits 39, so that, after a filling operation has been completed, gas may pass from within the tank upwardly into the uppermost portions of lines 34, and thereby allow any liquid within the downwardly extending portions of those lines to fall freely into the tanks, so that the liquid levels within the two tanks will not be affected by retention of liquid within lines 34 beyond their uppermost portions 38 in the direction of liquid flow.

The two fill lines 34 leading to tanks 25 and 26 respectively communicate with a common fill line 40, which is connectable by a flexible hose 41 with the meter 12 to be tested. Liquid is fed to the meter by pump 22 from the discharge side 42 of the pump, the liquid being drawn to the suction side 142 of the pump from tank 11. A pair of valves 43 and 44 individually control the flow of liquid from the pump into the two tanks respectively.

Liquid is discharged from the two tanks 25 and 26 to tank 111 through lines 45 leading from the centers of the lower slightly bulged bottoms of tanks 25 and 26, with the two discharge lines 45 being connected to a common discharge fitting 46, which is detachably connectable to a flexible discharge hose 47. The drainage of liquid from the two tanks through the specified discharge lines is controlled individually by a pair of manually actuated valves 48 and 49. In order to permit positive pumping of the liquid from either of the tanks 25 or 26, flexible hose 47 is adapted for connection into the suction side of pump 22 at 142, the pump discharge line 41 then being connectable into a tank such as tank 111 for discharge thereinto. A vent line 148 may be connected into either of the lines 45 or 46, at the highest point within these lines beyond or below valves 48 and 49. This vent may extend upwardly and connect into the top of one of the tanks 25 or 26, to allow gas from within that tank to flow downwardly into lines 45 and 46, when valves 48 and 49 are closed, and thus permit complete gravity emptying of lines 45. A valve 149 may be connected into this bent line 148, and is normally closed.

Referring now especially to Figs. 2 and 3, the two tanks 25 and 26 are so constructed that either may be separately filled to a predetermined level, and after reaching that level any excess liquid filled into the tank will automatically overflow either into the second tank or to discharge fitting 46 as may be desired. For determining these overflow levels, each of the tanks contains an essentially horizontal slightly upwardly spherically convex wall 50, which closes off communication between the upper and lower portions of the tank except through a central and upwardly projecting tubular overflow element 51. As will be understood, liquid from one of the lines 34 will fill into a corresponding one of the tanks until it reaches the level of the upper edge 52 of tubular element 51 within the tank. That upper edge 52 of element 51 of course lies in a horizontal plane when levels 21 indicate that the apparatus is at the normal leveled condition for use. After the liquid level reaches edge 52 in one of the tanks, the liquid overflows past that edge onto the upper surface of wall 50, and then flows to the outer edge of that wall by reason of its convexity, following which it may flow from the tank into an overflow line (line 53 leading from tank 25 or line 54 leading from tank 26).

The exact volume of liquid contained within each of the tanks when the liquid level reaches overflow edge 52 is precisely known. For example, the volume at overflow level in tank 25 may be precisely 600 gallons, while the volume at overflow level in tank 26 may be precisely 100 gallons. When the apparatus is first constructed, the volume at overflow level may be accurately adjusted by means of a displacement rod or screw 55, which is threadedly connected into a mounting fitting 56 in wall 50, and may be screwed into or out of the lower liquid containing chamber of a corresponding one of the tanks to vary its effective volume. Preferably, walls 50 and element 51 are spaced a substantial distance beneath the upper walls of the corresponding tanks.

The overflow line 53 leading from tank 25 above its wall 50 conducts overflow liquid into tank 26 at a location 57 below its wall 50. Fluid overflow through this line is controlled by a valve 58 positioned directly adjacent tank 26. Similarly, the reverse overflow line 54 from tank 26 leads into tank 25 at 59 beneath its wall 50, and contains a control valve 60 adjacent tank 25. The overflow from the two tanks may also be taken through a pair of lines 61, containing control valves 62 and 63 to a discharge hose 64 leading to any suitable discharge location.

In discussing a usual method of using the apparatus, assume that liquid is to be drawn by pump 22 from tank 11, and is to be filled into the two tanks 25 and 26 past meter 12, and that following the transferring operation an exact measurement of the transferred liquid is to be obtained from the accurately calibrated tanks 25 and 26, to determine whether the indication of meter 12 as to the amount of transferred liquid is correct, and to determine whether the level versus volume calibration of tank 11 is correct. In making such a calibration, the preferred way is to first fill liquid into tank 25 and then allow some of the liquid to overflow into tank 26. For this purpose, inlet valve 44 to tank 25 is open, while inlet valve 43 to tank 26 is closed. Both discharge valves 48 and 49 leading from the tanks are of course closed. The overflow valve 58 from 25 to tank 26 is open, while the reverse overflow valve 60, and the two valves 62 and 63 leading to discharge from the overflow lines are all closed.

With the valves in this condition, pump 22 is placed in operation at the full rate of transfer for which meter 12 is to be calibrated, and is kept in operation at that full speed until gauge glass 28 indicates a level corresponding to that of overflow edge 52 within tank 25. It has been discovered that the lag between the indication on gauge glass 28 and the actual liquid level within tank 25 is sufficiently great that when the gauge glass indicates a level corresponding to that of edge 52, the actual liquid level within tank 25 is considerably above that point. Consequently, when the gauge glass indicates the level of edge 52, the operator stops pump 22, and the excess liquid within tank 25 is allowed to overflow through line 53 into tank 26. In order to get an accurate measurement of exactly how much liquid has been transferred, to check against the reading of meter 12 or the level change in tank 11, the operator adds to the precisely known overflow volume of tank 25, the exact amount of liquid received in the smaller tank 26, as indicated by gauge board 31 and its vernier scale 32. Because tank 26 is of a small horizontal dimension as compared with tank 25, a reading in gallons taken from tank 26 may be considerably more accurate than a reading taken from the gauge glass 28 of tank 25. After the metering operation has been completed, valves 48 and 49 may be opened to allow the liquid to flow into underground tank 111.

Because the filling and overflow lines of tanks 25 and 26 are duplicated within the two tanks, it is possible to reverse the above discussed procedure if the occasion arises and to fill first into tank 26 and overflow into tank 25. Further, the duplicate connections to the two tanks permit filling into one tank at the same time that liquid is being withdrawn from the other tank, the overflow interconnections 53 and 54 then usually being closed. More specifically, assume that it is desired to calibrate an underground tank such as shown at 111, by progressively filling accurately known volumes of liquid into the tank and taking accurate level measurements within tank 111 after each measured quantity has been filled thereinto. In this case, pump 22 taking its suction from underground tank 11 would be employed to successively fill tanks 25 and 26 to their overflow conditions at which their volumes would be accurately known, and the overflow volumes of the tanks 25 and 26 would be successively allowed to drain into the tank 111 which was being calibrated. During the period in which inlet valve 44 to tank 25 was then opened, inlet valve 43 to tank 26 would be closed, and a previously filled overflow charge of liquid within tank 26 would be draining past open valve 49 into tank 111. During filling of tank 25, its discharge valve would of course be closed. In using the apparatus in this manner, it would of course be necessary to fill each tank slightly above its overflow level, to assure delivery of a complete charge into tank 111 on each drainging operation. The overflow thus filled into each of the tanks 25 and 26 might be returned to tank 11 through hose 64.

Fig. 4 illustrates a variational form of overflow apparatus for a unit of the type shown in Figs. 1 to 3. In Fig. 4, I have shown fragmentarily at 25a and 26a the larger and smaller calibrating tanks. These two tanks do not contain horizontal inner walls such as those shown at 50 in the first form of the invention, but instead contain centrally positioned upwardly opening and upwardly flaring funnel-like overflow receptacles 68, having overflow edges 69 lying in a common horizontal plane. After liquid has been filled into either of the tanks above the plane of overflow edges 69, any excess liquid then filled into the tank will overflow into the corresponding funnel-like receptacle 68, which leads the overflow liquid through a line 70 into the other tank. A pair of valves 71, corresponding to valves 53 and 60 of Fig. 2, are adapted to individually close off either of the two overflow lines. As in Fig. 1, the overflow from the tanks may pass to a line 66a, through a pair of valves 62a and 63a. Except for the details illustrated in Fig. 4, this second form of the invention is identical to that of Figs. 1 to 3, and of course may be used in the same manner.

I claim:

1. Calibrating equipment comprising a first tank, a second tank of smaller horizontal cross section than the first, inlet means for filling liquid into the first tank, means acting to overflow downwardly from the first tank into the second any liquid filled into the first tank above a predetermined level at which the liquid volume in the first tank is accurately known, and means for accurately indicating the volume of liquid which thus overflows into said second tank, said inlet means being adapted to fill liquid into the first of said tanks without simultaneously filling liquid into the second tank except by overflow from the first.

2. Calibrating equipment comprising a first tank, a second tank of smaller horizontal cross section than the first, inlet means for filling liquid into the first tank, means acting to overflow from the first tank into the second any liquid filled into the first tank above a predetermined level at which the liquid volume in the first tank is accurately known, means for accurately indicating the volume of liquid which thus overflows into said second tank, said inlet means being adapted in one condition of said equipment to fill liquid directly into only the first of said tanks without flow of any of the incoming liquid into the second tank except by overflow from the first, additional inlet means operable in a second condition of the equipment to fill liquid into said second tank directly without first passing through the first tank, valve means operable to control the flow of liquid to the tanks through said two inlet means and to thereby select as between said two operating conditions, and means acting to overflow from the second tank any liquid filled into the second tank above a predetermined level at which the liquid volume in the second tank is accurately known.

3. Calibrating equipment comprising a first tank, a second tank of smaller horizontal cross section than the first, inlet means for filling liquid into the first tank, means acting to overflow from the first tank into the second any liquid filled into the first tank above a predetermined level at which the liquid volume in the first tank is accurately known, means for accurately indicating the volume of liquid which thus overflow into said second tank, said inlet means being adapted in one condition of said equipment to fill liquid directly into only the first of said tanks without flow of any of the incoming liquid into the second tank except by overflow from the first, additional inlet means operable in a second condition of the equipment to fill liquid into said second tank directly without first passing through the first tank, valve means operable to control the flow of liquid to the tanks through said two inlet means and to thereby select as between said two operating conditions, and means acting to overflow from the second tank into the first any liquid filled into the second tank above a predetermined level at which the liquid volume in the second tank is accurately known.

4. Calibrating equipment as recited in claim 3, in which said two overflow means comprise means forming a pair of overflow passages interconnecting said tanks for passage of overflow liquid in opposite directions therebetween, said equipment including discharge passage means for discharging liquid from said overflow passages to the outside of both tanks, valve means for closing off the discharge of liquid from said overflow passages through said discharge passage means, and valve means for individually closing off the passage of overflow liquid between said tanks through said two overflow passages respectively.

5. Calibrating equipment as recited in claim 4, including valved outlet means for selectively discharging liquid from said tanks other than through said overflow passages, said first mentioned valve means being operable to selectively admit liquid to said tanks respectively through said two inlet means respectively.

6. Calibrating equipment as recited in claim 5, in which each of said two overflow means includes a horizontally extending upwardly bulging wall in the corresponding tank beneath the top thereof, a tubular overflow projection extending upwardly from said wall communicating with the underside thereof and having an upper edge over which liquid overflows onto the top of the wall, said two overflow passages communicating with said tanks respectively above said walls therein, and having second ends communicating with said tanks respectively beneath said walls.

7. Calibrating equipment as recited in claim 3, in which said valve means are operable to selectively admit liquid to said tanks respectively through said two inlet means respectively.

8. Calibrating equipment as recited in claim 3, including valved outlet means for selectively discharging liquid from said tanks.

9. Calibrating equipment as recited in claim 3, including valved outlet means for selectively discharging liquid from said tanks, and a pump operable to pump liquid either into or out of said tanks through said two inlet means and said outlet means.

10. Calibrating equipment comprising a first tank, a second tank of smaller horizontal cross section than the first, inlet means for filling liquid into the first tank, means acting to overflow downwardly from the first tank into the second any liquid filled into the first tank above a predetermined lever at which the liquid volume in the first tank is accurately known, and means for accurately indicating the volume of liquid which thus overflows into said second tank, said inlet means being adapted to fill liquid into the first of said tanks without simultaneously filling liquid into the second tank except by overflow from the first, said overflow means including a horizontally extending wall in said first tank at a location spaced beneath the top thereof, a tubular overflow projection extending upwardly from said wall communicating with the tank beneath said wall and having an upper edge over which liquid overflows onto the top of the wall when said predetermined liquid level is reached, and an overflow conduit leading from said first tank above the wall into said second tank.

11. Calibrating equipment comprising a first tank, a second tank of smaller horizontal cross section than the first, inlet means for filling liquid into the first tank, means acting to overflow downwardly from the first tank into the second any liquid filled into the first tank above a predetermined level at which the liquid volume in the first tank is accurately known, and means for accurately indicating the volume of liquid which thus overflows into said second tank, said inlet means being adapted to fill liquid into the first of said tanks without simultaneously filling liquid into the second tank except by overflow from the first, said overflow means including an upwardly opening funnel-like element in said first tank into which liquid overflows when said predetermined liquid level is reached, and a conduit connecting with said funnel-like element and leading said overflow liquid into the second tank.

12. Calibrating equipment comprising a first tank, a second tank of smaller horizontal cross section than the first, inlet means for filling liquid into the first tank, means acting to overflow downwardly from the first tank into the second any liquid filled into the first tank above a predetermined level at which the liquid volume in the first tank is accurately known, and means for accurately indicating the volume of liquid which thus overflows into said second tank, said inlet means being adapted to fill liquid into the first of said tanks without simultaneously filling liquid into the second tank except by overflow from the first, said overflow means comprising an overflow conduit leading from said first tank to the second, there being a discharge conduit leading from said overflow conduit to a discharge location outside of both of the tanks, and valve means for selectively closing off the fluid flow from said overflow conduit through said second tank or said discharge conduit respectively.

References Cited in the file of this patent

UNITED STATES PATENTS

| | | |
|---|---|---|
| 1,492,204 | Clark | Apr. 29, 1924 |
| 1,515,746 | Norman | Nov. 18, 1924 |
| 1,677,189 | Lindley | July 17, 1928 |
| 1,855,502 | Weymouth | Apr. 26, 1932 |
| 1,965,694 | Drum et al. | July 10, 1934 |
| 2,310,974 | Lumm | Feb. 16, 1943 |
| 2,370,210 | Turner | Feb. 27, 1945 |
| 2,504,304 | Cowan | Apr. 18, 1950 |

FOREIGN PATENTS

| | | |
|---|---|---|
| 508,828 | Great Britain | July 6, 1939 |